Nov. 9, 1965   C. W. HILL   3,216,052
RIBBED TORCH HANDLE
Filed May 3, 1963
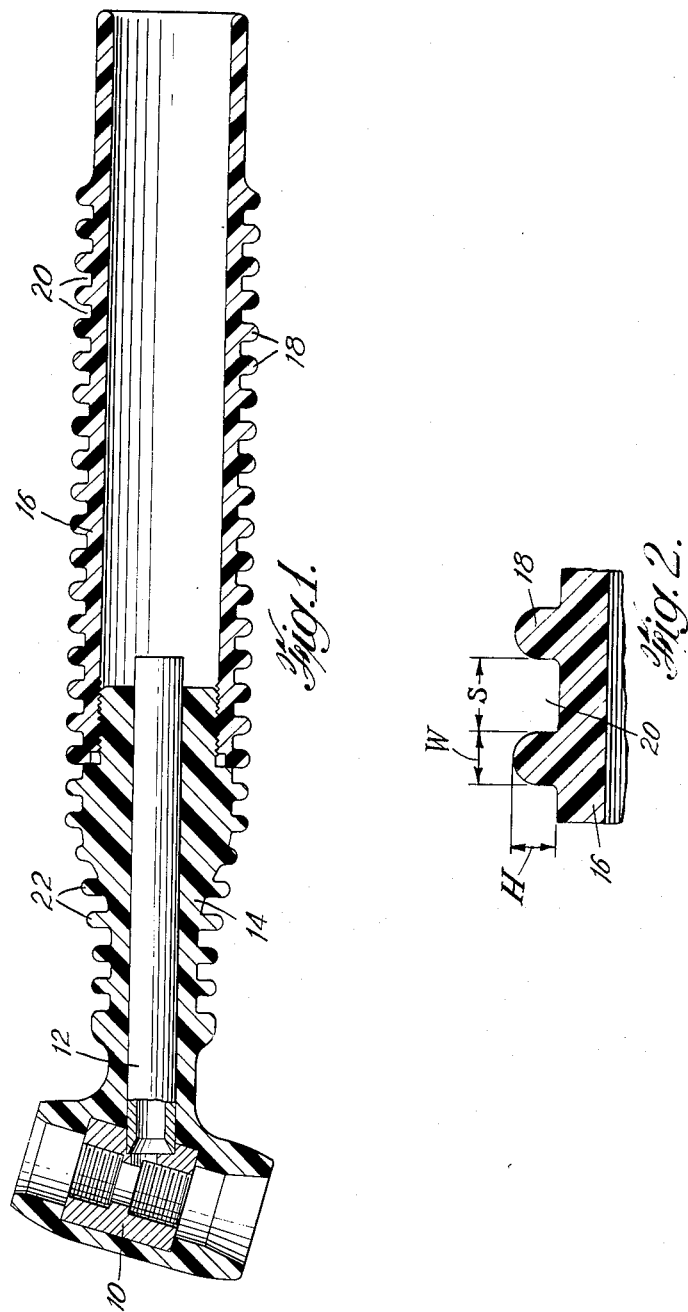
INVENTOR.
CLIFFORD W. HILL
BY Richard S. Shreve
ATTORNEY

United States Patent Office 3,216,052
Patented Nov. 9, 1965

3,216,052
RIBBED TORCH HANDLE
Clifford W. Hill, Mountainside, N.J., assignor to Union Carbide Corporation, a corporation of New York
Filed May 3, 1963, Ser. No. 277,942
1 Claim. (Cl. 16—116)

This invention relates to ribbed torch handles, and more particularly to air-cooled handles for welding torches and the like tools which are subject to temperatures high enough to cause discomfort to the hand holding the tool.

In the development of electric welding torches for increased amperage a major complaint of welders using earlier expedients has been that the handle or neck of the torch was too hot to hold.

According to a medical research group, total pain response is increased when there is an increase in the number of nerve endings that are stimulated. Since the nerve endings are more or less equally distributed it follows that a reduction in the area of stimulation will reduce the total resultant pain.

It is therefore the main object of the present invention to reduce the area of contact of the tool handle with the hand holding the tool.

In addition to the reduction of the contact area, it is desirable to facilitate cooling of the operator's hand and the torch. Other objects are therefore to increase the space between contact areas where natural air currents effect cooling of the operator's hand, and to increase this area for convection cooling of the torch.

According to the present invention the hot tool handle comprises a hollow cylinder of heat insulation having external projections substantially uniformly spaced apart thereon, the spacing of said projections being greater than the width thereof to reduce the area of contact with the holding hand and the height of said projections being greater than half the spacing thereof, to increase the area of the passage for air circulation.

In the drawings:
FIGURE 1 is an axial section through a gas-shielded arc torch provided with a cooling handle according to the preferred embodiment of the present invention; and
FIGURE 2 is an enlarged section of the handle shown in FIG. 1.

The torch comprises a metal frame comprising a head insert 10 and a supply tube 12. The head insert 10 is hollow to form a barrel to receive an electrode holder, and the tube 12 supplies electric current and shielding gas to the head insert 10.

The head insert 10 and supply tube 12 are covered with insulating material having a tapered neck 14 of increasing diameter. A hollow cylindrical handle grip 16 is screwed onto the end of the neck 14 in axial alignment therewith.

The handle grip 16 is provided with projections in the form of circumferential ridges 18 which are preferably substantially semicircular in axial section of the cylinder 16. These ridges have grooves 20 therebetween with substantially radial side walls. The height H of the ridges is more than half the width W thereof, and the width W is less than the spacing S between the ridges. The neck portion 14 has ridges 22 which are of greater height than the ridges 18, but of substantially the same spacing.

Considering only the area-pain relationship, it would be desirable to have a zero area of contact between the welder and the torch. However, the ribs must be sufficiently thick to prevent breakage, and this thickness would depend to some extent on the size and weight of the torch. On the ribbed 200 ampere torch it was necessary to use ridges of a width W of 3/32 in. To prevent a too irregular gripping surface, the spacing S between the ribs should not exceed about 1/8 in. The 1/8 in. spacing and 3/32 in. width ridges result in approximately 43 percent contact area for the final design of the 200 ampere torch.

The contact area could be reduced by using knobs instead of ribs. With 1/8 in. diameter knobs on 7/32 in. centers, the contact area would be approximately 26 percent. However, the rib design has various practical advantages as compared to the knob design.

With the ribbed design there is approximately 43 percent contact area and therefore approximately 57 percent area between the ribs where natural air currents effect cooling of the operator's hand. Obviously, it would be desirable to increase this area for convection cooling, but there are practical limitations on the thickness and spacing of the ribs, as previously discussed.

The ribs also increase the area for convection cooling of the torch, thus resulting in lower temperatures of the torch, including lower temperatures at the gripping surfaces. This area for greater convection cooling could be increased by increasing the outside diameter of the ribs. The outside diameter of the ribs on the handle of the 200 ampere air-cooled torch is 17/32 in., which is the approximate maximum for suitable gripping for operators with small hands. The ribs on the neck of the 200 ampere torch are 29/32 in. diameter, which is the same diameter as the head on the torch and thereby does not restrict welding in confined spaces. The 29/32 in. groove O.D. results in considerably higher ribs (11/64 in.) in the neck of the torch than on the handle (5/64 in.). These higher ribs in the neck are needed because of higher neck temperatures.

There is some increased cooling of the torch and gripping surfaces due to increased radiation cooling as a result of the increased surface area of the ribs.

Due to intermittent operation and due to radiant and convective cooling at the ribs and outside surfaces, there is a temperature gradient between the inside surfaces and the outside surfaces. These combined factors result in considerably lower temperatures at the outside of the grooves than at the bottom of the grooves. For example, after welding continuously for twenty minutes, which is an unusually long time, at 200 amperes D.C.S.P. on steel, the temperature at the top of the neck grooves was 178 deg. F., and the temperature at the base of the neck grooves was 243 deg. F. Even with the operator wearing heavy welding gloves, the 243 deg. F. is intolerable on an ungrooved surface. With heavy welding gloves the grooved surface at 178 deg. F. is tolerable for reasonable periods.

At locations farther removed from the head of the 200 ampere torch, the outside grooved surface temperatures are progressively reduced, with the result that there is very comfortable gripping temperatures throughout the handle. At any location on the outside grooved surfaces, the operator experiences substantially more discomfort from the heat of the arc than from the heat from the gripping surfaces. The converse was true with previous designs utilizing nonribbed gripping surfaces.

What is claimed is:

Hot tool handle comprising a hollow cylinder of insulating material having integral external projections substantially uniformly spaced apart on substantially the entire length thereof, the spacing of said projections being greater than the width thereof to reduce the area of contact with the tool-holding hand, and to increase the area of passage for air circulation, in which said handle comprises a grip portion, and a neck portion nearest the source of heat, and in which the projections on said neck portion are higher than those of said grip portion, for greater cooling of the part of said handle nearest the source of heat, and the projections are arranged along substantially the entire length of the handle, being located on both the grip portion and the neck portion thereof.

References Cited by the Examiner

UNITED STATES PATENTS

| | | | |
|---|---|---|---|
| 905,429 | 12/08 | Hollands | 16—116 |
| 1,705,884 | 3/29 | Wells | 16—116 |
| 2,415,778 | 2/47 | Welch | 16—116 |
| 2,424,437 | 7/47 | Dent | 16—116 |
| 2,838,740 | 6/58 | Larky et al. | 16—116 |
| 2,981,484 | 4/61 | Hirsch | 16—116 |
| 3,121,781 | 2/64 | Schoenwald | 16—116 |

DONLEY J. STOCKING, *Primary Examiner*